United States Patent
Tsujii

(10) Patent No.: US 9,582,892 B2
(45) Date of Patent: Feb. 28, 2017

(54) RADIATION IMAGING APPARATUS, RADIATION IMAGING METHOD, AND PROGRAM

(75) Inventor: Osamu Tsujii, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 833 days.

(21) Appl. No.: 12/851,245

(22) Filed: Aug. 5, 2010

(65) Prior Publication Data

US 2011/0058727 A1 Mar. 10, 2011

(30) Foreign Application Priority Data

Sep. 9, 2009 (JP) ................................ 2009-208600

(51) Int. Cl.
 *G06K 9/00* (2006.01)
 *G06T 7/00* (2006.01)

(52) U.S. Cl.
 CPC .......... *G06T 7/0097* (2013.01); *G06T 7/0081* (2013.01)

(58) Field of Classification Search
 CPC ......... G06T 7/0012; G06T 2207/10081; G06T 2207/10116; A61B 2019/5289; A61B 6/032; A61B 6/4441
 USPC ....................................................... 382/132
 See application file for complete search history.

(56) References Cited

U.S. PATENT DOCUMENTS

| | | | |
|---|---|---|---|
| 7,050,537 B2 | 5/2006 | Tsujii | 378/95 |
| 7,315,606 B2 | 1/2008 | Tsujii | 378/20 |
| 7,386,157 B2 | 6/2008 | Tago et al. | 378/130 |
| 7,403,646 B2 | 7/2008 | Sato | 382/132 |
| 7,447,346 B2 | 11/2008 | Sato | 382/132 |
| 7,564,998 B2 | 7/2009 | Tsujii | 382/128 |
| 2002/0090126 A1* | 7/2002 | Oosawa | G06T 7/0012 382/132 |
| 2003/0086523 A1* | 5/2003 | Tashiro | A61B 6/00 378/19 |

(Continued)

FOREIGN PATENT DOCUMENTS

| | | |
|---|---|---|
| JP | 2000-033082 | 2/2000 |
| JP | 2002-063563 | 2/2002 |

(Continued)

OTHER PUBLICATIONS

Extended European Search Report, issued Aug. 10, 2012 in EPO counterpart application 1016984.9 (in English).

*Primary Examiner* — Reginald R Reyes
(74) *Attorney, Agent, or Firm* — Fitzpatrick, Cella, Harper & Scinto

(57) ABSTRACT

A radiation imaging apparatus comprising: an image capture unit capturing a radiation image; a first decision unit deciding, as a first region of interest, a region of interest from a region of a first radiation image; a first extraction unit extracting the first region of interest from the first radiation image; a form decision unit deciding a first form from the first region of interest; a first display unit enlarging and displaying the first region of interest; a first search unit searching a region of a second radiation image for a second form similar to the first form; a second decision unit deciding a second region of interest from the second radiation image so as to include the second form; a second extraction unit extracting the second region of interest from the second radiation image; and a second display unit enlarging and displaying the second region of interest.

25 Claims, 8 Drawing Sheets

(56) References Cited

U.S. PATENT DOCUMENTS

| | | | |
|---|---|---|---|
| 2004/0059214 A1* | 3/2004 | Tomoda et al. | 600/410 |
| 2004/0215071 A1* | 10/2004 | Frank | A61B 6/4441 600/407 |
| 2004/0218804 A1* | 11/2004 | Affleck et al. | 382/141 |
| 2009/0220174 A1* | 9/2009 | Saito | G06K 9/3275 382/296 |
| 2009/0232270 A1 | 9/2009 | Okunuki et al. | 378/5 |
| 2009/0232272 A1 | 9/2009 | Tsujii et al. | 378/16 |
| 2009/0310845 A1* | 12/2009 | Ogawa et al. | 382/132 |
| 2010/0111250 A1 | 5/2010 | Tsujii et al. | 378/37 |
| 2013/0237809 A1* | 9/2013 | Hasegawa | A61B 1/041 600/424 |

FOREIGN PATENT DOCUMENTS

| | | |
|---|---|---|
| JP | 2003-099021 | 4/2003 |
| JP | 2004-056230 | 2/2004 |
| JP | 2004-343176 | 12/2004 |
| JP | 2005-324058 | 11/2005 |

* cited by examiner

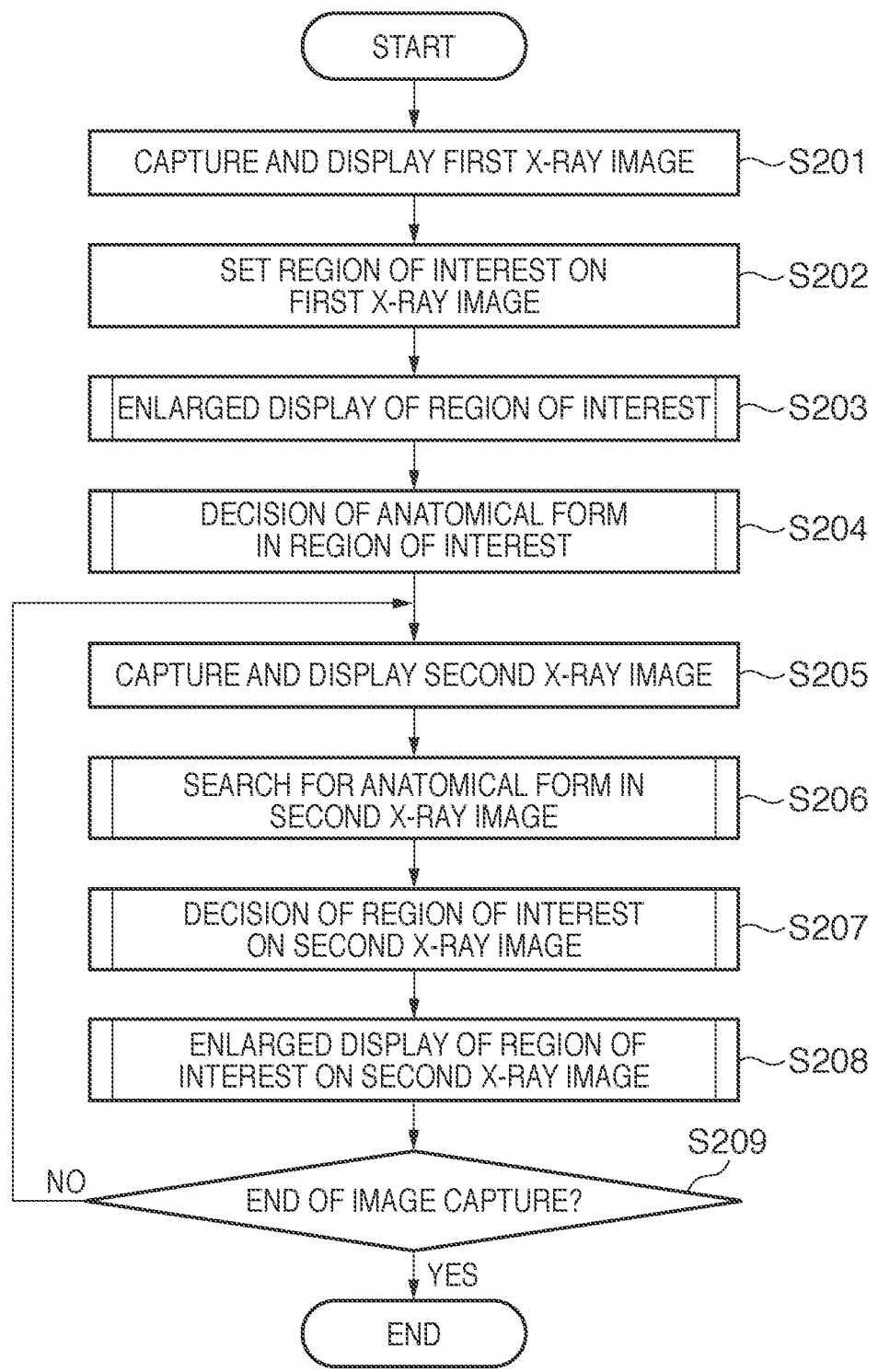

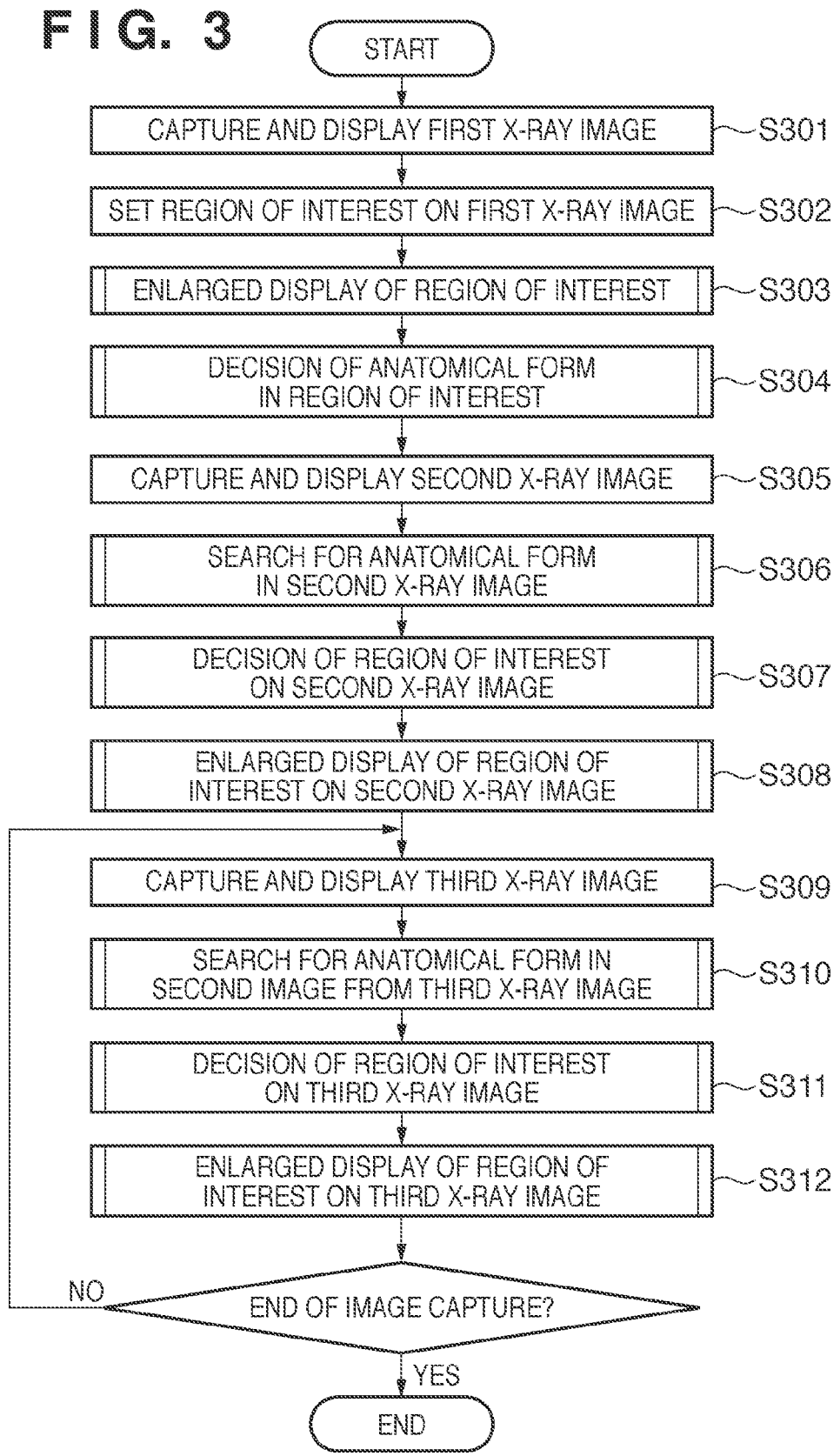

STATE 1

FIRST IMAGE

STATE 2

EXPOSURE REGION

SECOND IMAGE

RADIATION IMAGING APPARATUS, RADIATION IMAGING METHOD, AND PROGRAM

BACKGROUND OF THE INVENTION

Field of the Invention

The present invention relates to a radiation imaging apparatus, a radiation imaging method, and a program.

Description of the Related Art

As a radiation imaging apparatus, for example, an X-ray imaging apparatus using an FPD (Flat Panel Detector) has been commercialized. FPDs allow increases in area and reductions in thickness and weight. Portable X-ray imaging apparatuses using portable FPDs in cassette form are used for medical applications and the like.

Japanese Patent Laid-Open No. 2000-033082 discloses an image processing apparatus which recognizes an exposure field region of radiation, and sets a region of interest which is included in the recognized exposure field region and which includes the center point of the exposure field region. This apparatus then corrects the region of interest based on image data near the set region of interest. The apparatus decides image processing conditions based on the image data in the corrected region of interest, and performs image processing based on the decided image processing conditions.

Japanese Patent Laid-Open No. 2005-324058 discloses a radiation image processing apparatus which positions each of a plurality of chest radiation images indicating the respiratory dynamics of the chest of an object (a patient) and constituting a dynamic chest image, based on a predetermined anatomical region in each chest radiation image.

Japanese Patent Laid-Open No. 2004-056230 discloses a technique of estimating past and current rotational angles from past and current X-ray images as three-dimensional projection images, deriving a relational expression for obtaining one point f on the past image and a point g after deformation from the past image by using the obtained angles, and performing deformation for each depth. This reference discloses a method of obtaining the difference between the deformed past image and the current image. This method can position three-dimensional projection images even with back-and-forth tilting or rotation of a target.

According to Japanese Patent Laid-Open No. 2004-343176, when a user selects a mode of displaying only a shadow increase (disappearance) in the difference image generated by a difference processing unit, the difference image is subjected to tone conversion such that only the region where the shadow increases (disappears) has a brightness different from those of the remaining regions. This reference discloses an apparatus which displays the state of each shadow change individually as an image by displaying the tone-converted difference image on a display unit, thereby facilitating the observation of each shadow change. With this technique, when displaying a difference image, even if a plurality of shadow changes have occurred, the apparatus allows easy and reliable observation of each shadow change, and also allows easy and reliable determination to be performed in a follow-up.

Conventionally, surgical operations such as orthopedic operations have been performed by using surgical C-arms (moving image apparatuses). Some operations are performed by using portable radiation imaging apparatuses (e.g., portable X-ray imaging apparatuses) to which FPDs are connected in place of conventional surgical C-arms. The reason why a portable X-ray imaging apparatus is used in place of a surgical C-arm is that the apparatus provides the convenience of requiring a sensor to be placed near an operating table only when X-ray imaging is required. Another reason is that when a surgical C-arm is used, a sensor unit and a tube unit positioned near the operating table may interfere with excision and the like.

The portable radiation imaging apparatus has, however, a problem that the positional relationship between the sensor unit and the tube unit changes for every imaging operation. For this reason, it is necessary to perform image capture upon setting a wide radiation application range for a patient and to extract and display a region of interest from a captured image for every image capture. This extracting/displaying operation is generally performed several tens of times. That is, this operation is cumbersome. In addition, the extraction position of an assistant who performs the extracting operation varies. This may affect the determination made by a doctor.

SUMMARY OF THE INVENTION

In consideration of the above problem, the present invention provides a technique of improving the diagnostic performance of a doctor in surgical operation by extracting a region of interest from a captured image and enlarging and displaying the region when using a portable radiation imaging apparatus to which an FPD is connected in place of a conventional surgical C-arm.

According to one aspect of the present invention, there is provided a radiation imaging apparatus comprising:

an image capture unit adapted to capture a radiation image;

a first decision unit adapted to decide, as a first region of interest, a region of interest as an observation area from a region of a first radiation image captured by the image capture unit;

a first extraction unit adapted to extract the first region of interest from the first radiation image;

a form decision unit adapted to decide a first form which is an observation target form from the first region of interest;

a first display unit adapted to enlarge and display the first region of interest;

a first search unit adapted to search a region of a second radiation image captured by the image capture unit for a second form similar to the first form of the first radiation image;

a second decision unit adapted to decide a second region of interest from a region of the second radiation image so as to include the second form;

a second extraction unit adapted to extract the second region of interest from the second radiation image; and a second display unit adapted to enlarge and display the second region of interest.

According to the present invention, it is possible to improve the diagnostic performance of a doctor in surgical operation by extracting a region of interest from a captured image and enlarging and displaying the region when using a portable radiation imaging apparatus to which an FPD is connected in place of a conventional surgical C-arm.

Further features of the represent invention will become apparent from the following description of exemplary embodiments (with reference to the attached drawings).

BRIEF DESCRIPTION OF THE DRAWINGS

FIG. 2 is a flowchart for the portable radiation imaging apparatus according to the first embodiment;

FIG. 3 is another flowchart for the portable radiation imaging apparatus according to the first embodiment;

DESCRIPTION OF THE EMBODIMENTS

First Embodiment

Figure 1:
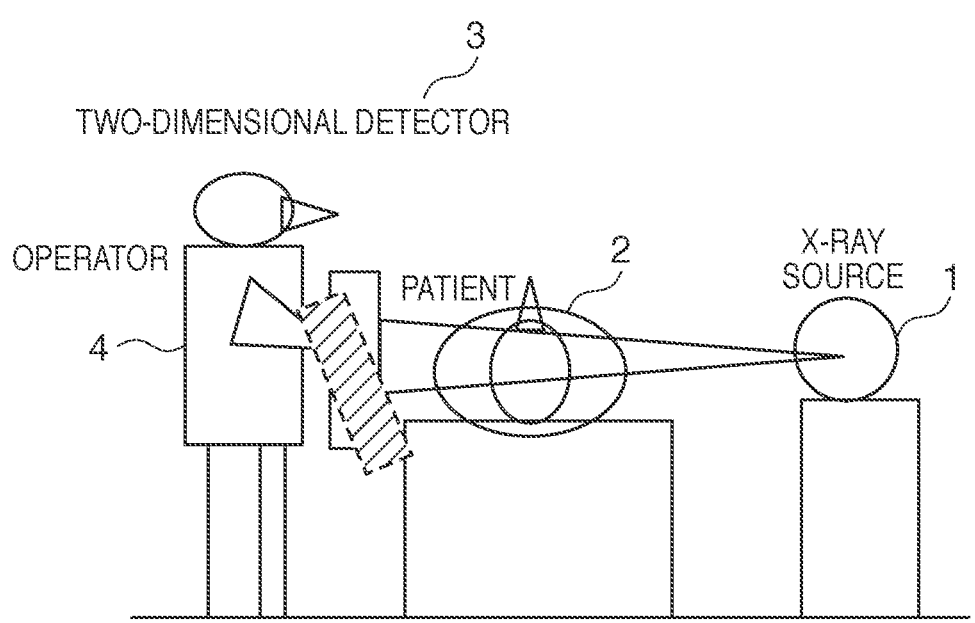
FIG. 1 is a view showing a method of using a portable radiation imaging apparatus according to the first embodiment.

The manner of using a portable X-ray imaging apparatus as an example of a portable radiation imaging apparatus will be described below with reference to FIG. 1. When providing medical treatment for a patient in an operating room, an operator 4 of the apparatus (e.g., a doctor) performs X-ray imaging while holding a two-dimensional detection unit 3. It is assumed that the operator 4 holds the detection unit by a method that does not allow accurate reproduction of a position as well as manually holding the detection unit. When a C-arm or U-arm holds the detection unit, it is assumed that position reproduction is accurate. It is therefore thought that the problem that the present invention is to solve does not often occur.

A flowchart for the portable X-ray imaging apparatus according to the present invention will be described with reference to FIG. 2. The operator 4 applies X-rays to an object to capture the first X-ray image (first radiation image), whose reduced image is displayed on a user interface unit 6 (step S201). The operator 4 decides the first region of interest on the reduced image displayed on the user interface unit 6 by using a region-of-interest decision unit 10 functioning as the first decision unit (step S202). A "region of interest" is a region indicating an observation area which a doctor wants to observe upon enlarged display. This area includes an anatomical form as an observation target in surgical operation. An enlarged image display unit 7 functioning as the first display unit enlarges and displays the first region of interest decided by an extraction unit 11 functioning as the first extraction unit and extracted from the region irradiated with X-rays (step S203). An anatomical form decision unit 8 decides an anatomical form in the decided first region of interest as the first form (step S204). By "anatomical form" is meant such as a continuous bone structure such as cervical vertebrae, thoracic vertebrae, or joints. It is possible to reverse the order of steps S203 and S204. When step S204 is to be performed first, a parameter for tone conversion in enlarged display operation is decided based on a decided anatomical form (first form).

After the progress of surgical operation, the operator 4 (a doctor or the like) applies X-rays to the object to capture the second X-ray image (second radiation image), and displays the reduced image on the user interface unit 6 (step S205). An anatomical form search unit 9 functioning as the first search unit searches the second X-ray image for an anatomical form (second form) similar to the anatomical form (first form) decided in the first X-ray image (step S206). The anatomical form search unit 9 uses a pattern matching technique. In order to speed up pattern matching processing, the search area for pattern matching is reduced. An X-ray exposure field is recognized in the second X-ray image to reduce the search area for the anatomical form. The anatomical form search unit 9 sometimes makes a search for an affine transform of an anatomical form. If the pattern match degree is low, an affine transform is performed. It can be said that the pattern match degree is low when the position reproduction and tilt reproduction of the two-dimensional detection unit 3 are poor at the time of the acquisition of the first and second X-ray images. Assume that when the pattern match degree of the second form is higher than a predetermined value, the first search unit determines that the second form is a region similar to the first form.

The region-of-interest decision unit 10 functioning as the second decision unit decides the second region of interest on the second X-ray image so as to include the located anatomical form (second form) (step S207). The region-of-interest decision unit 10 decides the second region of interest on the second X-ray image such that its shape and area become the same as those of the first region of interest on the first X-ray image. Anatomical forms are placed at identical positions in the respective regions of interest. The reason why anatomical forms are placed at identical positions is to facilitate the recognition of the difference between the anatomical forms when the enlarged image display unit 7 switches the display of the first region of interest to the second region of interest. The extraction unit 11 functioning as the second extraction unit extracts the decided second region of interest from the second X-ray image. The enlarged image display unit 7 functioning as the second display unit then enlarges and displays the extracted region (step S208). When repeating image capture, this apparatus searches for the anatomical form (first form) decided on the first X-ray image on the third and fourth X-ray images (step S209).

A flowchart for processing in the portable X-ray apparatus according to the present invention which is different from that shown in FIG. 2 will be described with reference to FIG. 3. The processing from step S301 to step S308 is the same as that from step S201 to step S208 which has been described with reference to FIG. 2. Referring to FIG. 3, after step S308, the third X-ray image is captured, and a reduced image of the captured image is displayed on the user interface unit 6 (step S309). The anatomical form search unit 9 functioning as the second search unit searches the third X-ray image (third radiation image) for an anatomical form (third form) similar to the anatomical form (second form) decided in the second X-ray image (step S310). Searching for an anatomical form (second form) captured at a closer time point in chronological order makes it possible to increase the pattern match degree. Increasing the pattern match degree will facilitate the recognition of the difference between the second and third regions of interest when the display of the second region of interest is switched to that of the third region of interest on the enlarged image display unit 7 functioning as the third display unit. The region-of-interest decision unit 10 functioning as the third decision unit decides the third region of interest on the third X-ray image so as to include the located anatomical form (third form) (step S311). The third extraction unit extracts the decided third region of interest from the third X-ray image, and the enlarged image display unit 7 functioning as the third display unit enlarges and displays the extracted region (step S312).

Figure 4A:
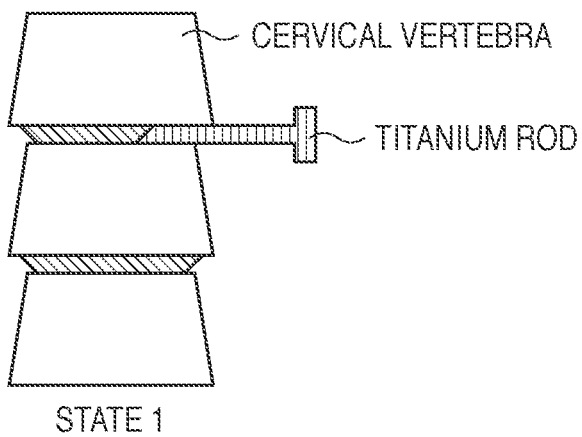
FIG. 4A is a view showing state 1 of an object.
Figure 4B:
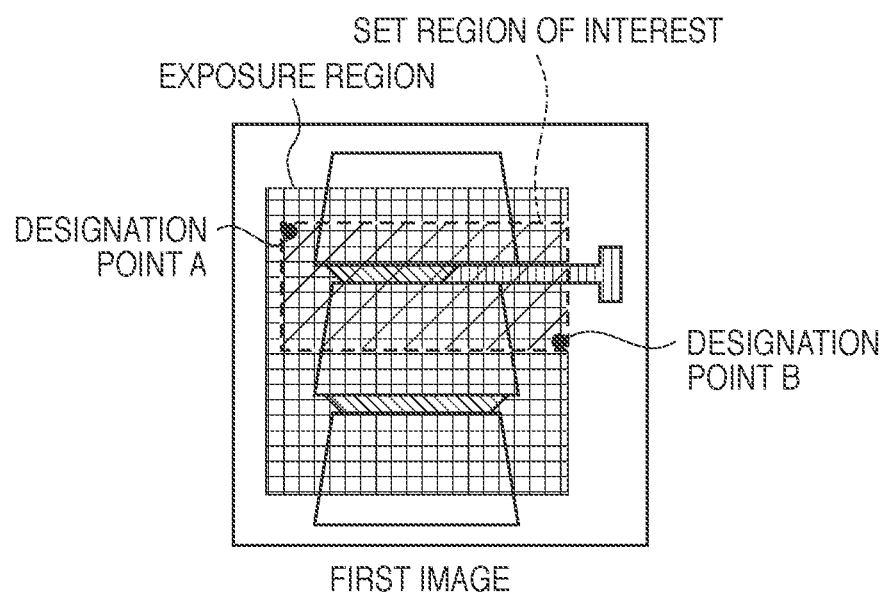
FIG. 4B is a view showing an image captured by X-ray imaging of state 1 of the object.

The above flowchart will be described with reference to FIGS. 4A to 4C, assuming that a surgical operation is being performed on the cervical vertebrae. As shown in FIG. 4A, a titanium rod is inserted between cervical vertebrae. The doctor inserts the titanium rod while making a check on an X-ray image. The doctor installs the two-dimensional detection unit 3 in state 1 shown in FIG. 4A and applies X-rays to the object. FIG. 4B shows the resultant captured X-ray image. The outer rectangle indicates the outer shape of the two-dimensional detection unit 3. The rectangular portion indicated by the grid lines is the region irradiated with X-rays. The operator 4 wants to observe how the titanium rod is inserted between the cervical vertebrae. The operator 4 sets the region of interest indicated by the hatched lines by designating a designation point A and a designation point B on the user interface unit 6. The enlarged image display unit 7 enlarges and displays the region of interest indicated by the hatched lines.

Figure 4C:
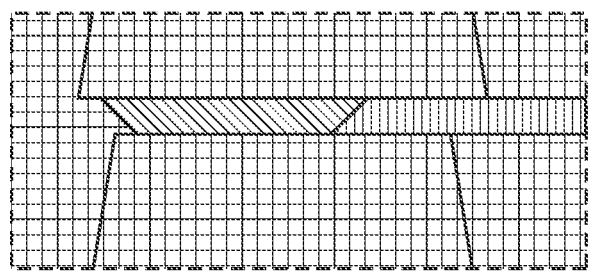
FIG. 4C is an enlarged view of the image captured by X-ray imaging of state 1 of the object.

FIG. 4C shows a region of interest on the enlarged/displayed first X-ray image. The anatomical form decision unit 8 decides an anatomical form in the region of interest on the first X-ray image. For example, the anatomical form is a binary image of the region of interest. If the contour of a bone like a cervical vertebra cannot be satisfactorily expressed by a binary image, it is possible to use the image obtained by edge enhancement filtering or the image obtained by binarizing an image having undergone edge enhancement filtering. If there are lines detaching from the contour line of the bone upon binarization, lines exhibiting small numbers of continuous points are removed by labeling. The anatomical form calculated by the above technique is represented by $T(m, n)$ $(m=0, \ldots, M-1; n=0, \ldots, N-1)$. In this case, $T(m, n)$ is not limited to a binary image but may represent a multivalued image.

Figure 5A:
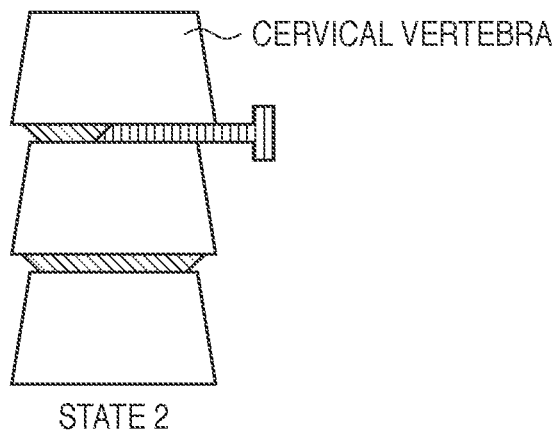
FIG. 5A is a view showing state 2 of an object.
Figure 5B:
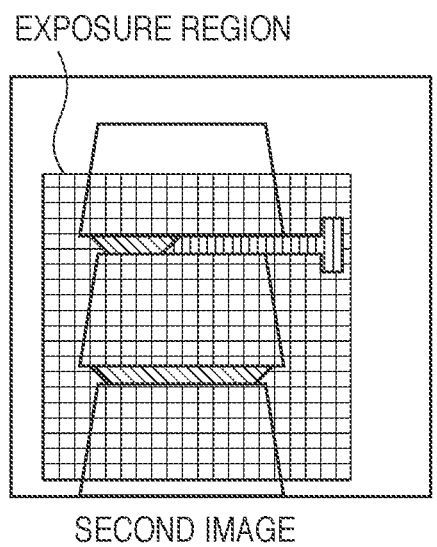
FIG. 5B is a view showing an image captured by X-ray imaging of state 2 of the object.
Figure 5C:
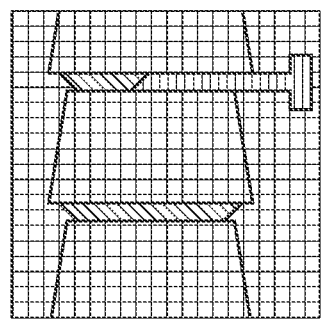
FIG. 5C is a view showing an exposure field region image of state 2 of the object.

FIG. 5B shows the second X-ray image captured by irradiating the object with X-rays in state 2 shown in FIG. 5A upon installing the two-dimensional detection unit 3. In state 2 in FIG. 5A, the titanium rod is inserted between the cervical vertebrae deeper than in state 1 in FIG. 4A. Since the doctor has manually installed the two-dimensional detection unit 3, the exposure field on the cervical vertebrae in FIG. 5B differs from that in FIG. 4C. Exposure field recognition is performed for the second X-ray image shown in FIG. 5B. Exposure field recognition uses histogram analysis. In histogram analysis, the histogram of the overall second X-ray image is obtained to check the presence/absence of a region which is not irradiated with X-rays. If there is a region which is not irradiated with X-rays, only the region irradiated with X-rays is extracted from the overall second X-ray image. FIG. 5C shows the extracted exposure field region image. The exposure field region image is represented by $f(i, j)$ $(i=0, \ldots, I-1; j=0, \ldots, J-1)$(for $M \leq I$ and $N \leq J$).

The anatomical form search unit 9 searches the exposure field region image shown in FIG. 5C for an anatomical form. The anatomical form search unit 9 performs this search by using a template matching (pattern matching) technique or the like. An L1 norm or normalized correlation is available as an evaluation criterion representing the similarity between halftone images in template matching. Assume that an L1 norm is used as an evaluation criterion. In this case, when a template (an anatomical form in this case) differs in brightness from a search target image (an exposure field region image in this case), the similarity between them may be determined to be low, even if they look similar to the naked eye. If a normalized correlation coefficient is used as an evaluation criterion, this technique is free from the influence of the difference in brightness between the template and the search target image. On the other hand, the technique requires a long calculation time.

This embodiment will exemplify a case in which an anatomical form is a binary image. However, it is possible to use a multivalued image. If an anatomical form is a binary image, an exposure field region image $f(i, j)$ is also binarized. In the case of a binary image, an L1 norm as an evaluation criterion is suitable for high-speed search. This is because there is no problem in terms of the brightness difference between images. In the exposure field region image $f(i, j)$, a partial image having the same size as $T(m, n)$ and having a starting point $(u, v)$ is represented by $f(u, v)(m, n)$ $(m=0, \ldots, M-1; n=0, \ldots, N-1)$. The similarity between $T(m, n)$ and $f(u, v)(m, n)$ is represented by the sum total (L1 norm) of the differences between the corresponding respective pixels. $L1(u, v)$ as the L1 norm between $T(m, n)$ and $f(u, v)(m, n)$ can be given by equation (1). The smaller the value of $L1(u, v)$, the higher the similarity.

$$L1(u,v) = \Sigma\Sigma |f(u,v)(m,n) - T(m,n)| \tag{1}$$

Figure 6A:
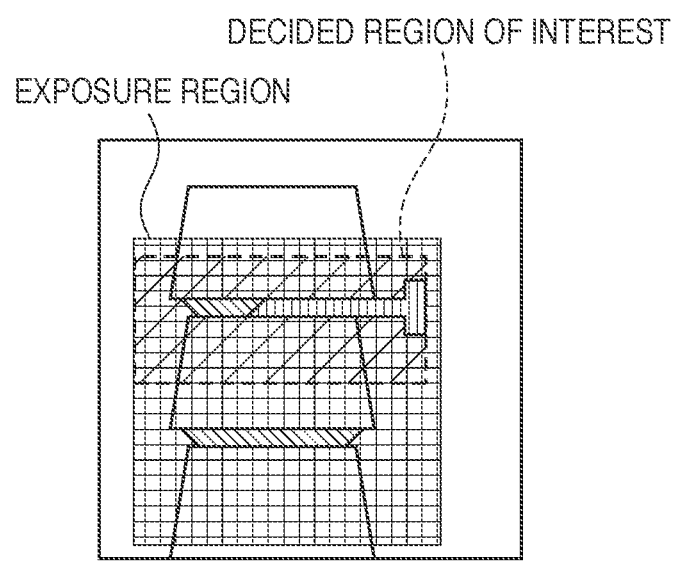
FIG. 6A is a view showing a decided region of interest of state 2 of the object.
Figure 6B:
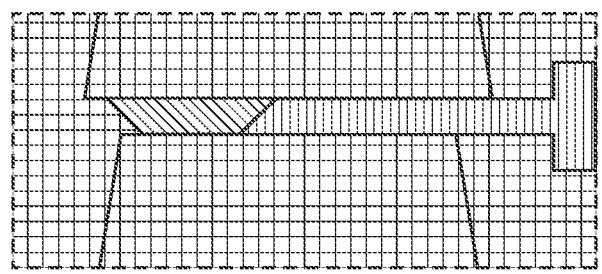
FIG. 6B is an enlarged/displayed image of state 2 of the object.

FIG. 6A shows a decided region of interest using a point $(u, v)$ indicating a small value of $L1(u, v)$ as a starting point. FIG. 6B shows the image obtained by enlarging and displaying the decided region of interest extracted from the exposure field. If a multivalued image is to be used as an anatomical form, it is desired to use a normalized function coefficient as an evaluation criterion. This is because a problem occurs in terms of the brightness difference between the images. The normalized correlation coefficient $R(u, v)$ takes values from −1 to 1. The closer to 1 the normalized correlation coefficient, the higher the similarity between the template $T(m, n)$ and the partial image $f(u, v)(m, n)$. The closer to −1 the normalized correlation coefficient, the higher the similarity between the template $T(m, n)$ and the reverse image of the partial image $f(u, v)(m, n)$. When the template $T(m, n)$ is identical to the partial image $f(u, v)(m, n)$, $R(u, v)=1$.

The above evaluation criterion represents a pattern match degree. If the evaluation criterion is less than or equal to a predetermined value (threshold), the pattern match degree is recognized low. Two factors are conceivable as causes of low degrees of matching. The first factor that decreases the degree of matching is a threshold for binarization processing. If an anatomical form differs in brightness from an exposure field region image, the contours of images to be extracted differ from each other. For this reason, this apparatus calculates the above evaluation criterion by using different binarization thresholds for an anatomical form and an exposure field region image, thereby examining a case in which the degree of matching is high.

The second factor that decreases the degree of matching is a case in which the first and second X-ray images are captured at different enlargement ratios or different tilts. FIG. 1 shows a state in which the apparatus performs image capture upon setting the two-dimensional detection unit 3 at different tilts. Assume that the distance from an X-ray source 1 to a patient is constant. Even in this case, if the operator 4 installs a two-dimensional detector 3 at a position away from a patient, the enlargement ratio increases. It is possible to calculate changes in enlargement ratio and tilt by analyzing the striped pattern and shading caused by the grid set for the reduction of scattered radiation.

Figure 7:
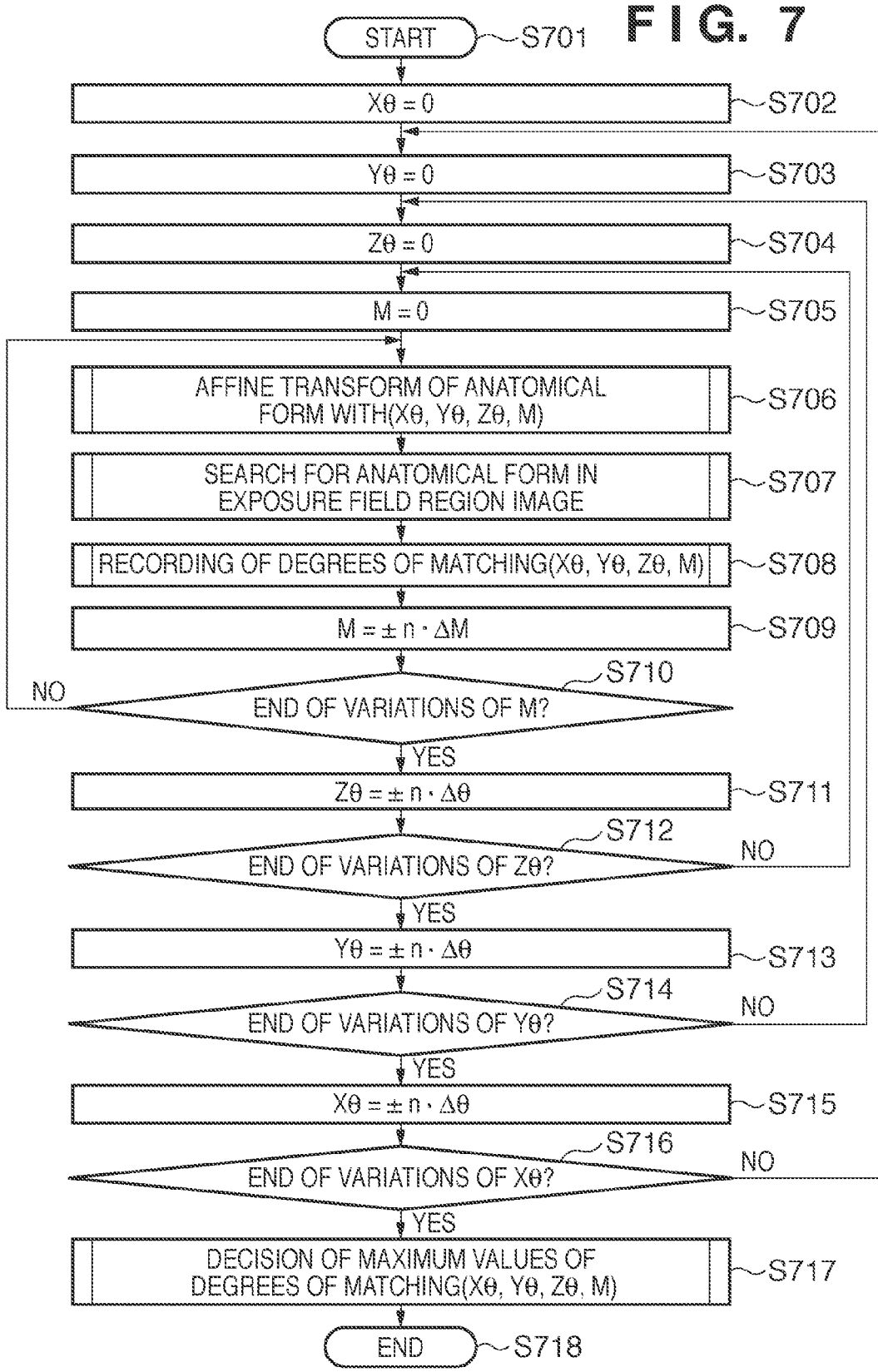
FIG. 7 is a flowchart for the processing of deciding affine transform parameters.

If only a tilt change occurs without any change in enlargement ratio, it is difficult to calculate the amount of tilt because shading is uniform on the entire X-ray image. Another method is to generate a plurality of affine-transformed images assuming that a tilt has occurred, as shown in the flowchart of FIG. 7. More specifically, the apparatus creates a plurality of affine-transformed images upon rotating a template (anatomical form) about a combination of X-, Y-, and Z-axes, and calculates the degrees of pattern matching between the rotated anatomical forms and the exposure field region image. The apparatus uses the rotation of a rotated anatomical form exhibiting the highest degree of matching as the tilt of the second X-ray image. The apparatus may also create a plurality of affine-transformed images in consideration of changes in enlargement ratio in addition to a combination of the rotations of the X-, Y-, and Z-axes. Referring to FIG. 7, the X-, Y-, and Z-axes indicate the longitudinal and lateral axes of a plane of an anatomical form and an axis perpendicular to the plane. In addition, $X\theta$, $Y\theta$, $Z\theta$, and M respectively represent the rotation of the X-axis, the rotation of the Y-axis, the rotation of the Z-axis, and an enlargement ratio. Obviously, the apparatus may affine-transform only an exposure field region image without affine-transforming an anatomical form. In general, since an anatomical form is smaller in the number of pixels than an exposure field region image, affine-transforming the anatomical form can speed up the processing more.

The flowchart of FIG. 7 will be described in detail below. First of all, 0s are assigned as initial conditions to $X\theta$, $Y\theta$, $Z\theta$, and M (from step S701 to step S705). This apparatus then affine-transforms an anatomical form by using $X\theta$, $Y\theta$, $Z\theta$, and M (step S706), and searches an exposure field region image for the anatomical form (step S707). The apparatus records the pattern match degree (step S708). The apparatus assigns values from $n \cdot \Delta M$ to $-n \cdot \Delta M$ to the enlargement ratio M. The process returns to step S706 until all the variations of M are complete (step S710). In this case, n represents a natural number and is set to a predetermined value. Assume that $\Delta M$ represents the minimum step of the enlargement ratio M, and is an empirically predetermined value. When all the variations of M are complete, the process advances to step S711. Likewise, the apparatus assigns values from $n \cdot \Delta \theta$ to $-n \cdot \Delta \theta$ to $Z\theta$. The process returns to step S705 until all the variations of $Z\theta$ are complete (step S712). Likewise, assume that $\Delta \theta$ represents the minimum step of the angle $\theta$, and is an empirically predetermined value. When all the variations of $Z\theta$ are complete, the process advances to step S713. Likewise, the apparatus assigns values from $n \cdot \Delta \theta$ to $-n \cdot \Delta \theta$ to $Y\theta$. The process returns to step S704 until all the variations of $Y\theta$ are complete (step S714). When all the variations of $Y\theta$ are complete, the process advances to step S715. Likewise, the apparatus assigns values from $n \cdot \Delta \theta$ to $-n \cdot \Delta \theta$ to $X\theta$. The process returns to step S703 until all the variations of $X\theta$ are complete (step S716). When all the variations of $X\theta$ are complete, the process advances to step S717. The apparatus decides the maximum value from the degrees of pattern matching in each of $X\theta$, $Y\theta$, $Z\theta$, and M recorded in the process of the flowchart described above (step S717), and then terminates the processing (step S718).

In the above manner, a region of interest is extracted in consideration of enlargement ratios and tilts. When displaying the second X-ray image on the enlarged image display unit 7, the apparatus can display the image upon affine-transforming it such that it has the same enlargement ratio and tilt as those of the first X-ray image. The merit of affine-transforming the second X-ray image in accordance with the first X-ray image is that the doctor can easily recognize the difference between the images. It is therefore desired to extract a region of interest such that the region of interest on the second X-ray image is equal in size to that in the first X-ray image. It is also desired to make the position of an anatomical form in the region of interest on the second image coincide with that in the first image for the following reason. If the position of an anatomical form in the region of interest on the second image is not the same as that in the first image, the position of the anatomical form changes when the enlarged image display unit 7 switches and displays the images. This makes it difficult to recognize the degree of the progress of a medical treatment.

Figure 8:
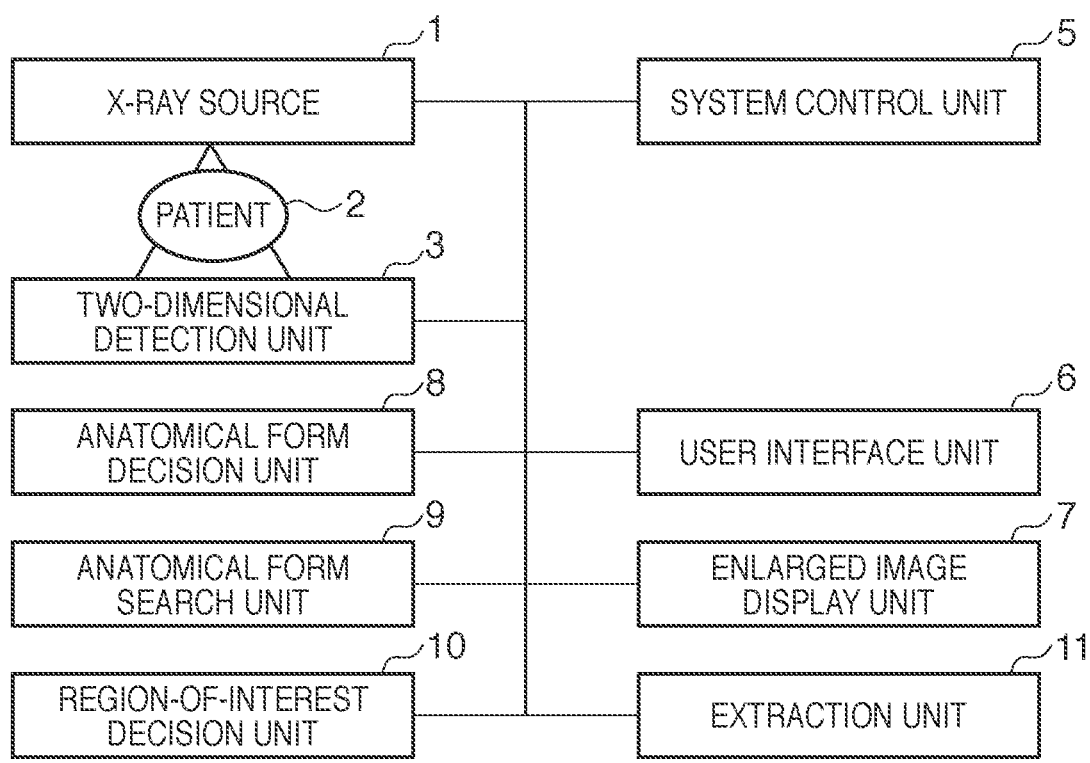
FIG. 8 is a block diagram showing the arrangement of a portable radiation imaging apparatus according to the present invention.

FIG. 8 shows an example of the hardware arrangement of the portable radiation imaging apparatus according to this embodiment. A system control unit 5 includes a computer. Therefore, the components other than an X-ray source 1 and a two-dimensional detection unit 3 can be implemented by computer software.

According to this embodiment, when a portable radiation imaging apparatus to which an FPD is connected is used, since a region of interest is extracted from a captured image and is enlarged and displayed, it is possible to improve the diagnostic performance of the doctor in surgical operation.

Second Embodiment

According to the first embodiment, the regions of interest on the first and second X-ray images are sequentially displayed. Displaying a difference image based on the first and second X-ray images instead of sequentially displaying them allows the doctor to clearly recognize the progress of medical treatment. When simultaneously displaying a difference image, it is desired to assign the difference portion with a slope having a high contrast in tone display. Even when displaying no difference image, it is desired to assign a difference portion with a slope having a high contrast in tone display.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-208600, filed Sep. 9, 2009, which is hereby incorporated by reference herein in its entirety.

What is claimed is:

1. An X-ray imaging apparatus comprising:
a portable X-ray detector for obtaining an X-ray image in X-ray imaging using an X-ray source, said portable X-ray detector being physically independent from the X-ray source; and
at least one processor and memory operatively coupled and cooperating to function as:
a receiving unit configured to receive a first X-ray image and a second X-ray image of an object, from the portable X-ray detector;
a setting unit configured to set a first region of interest of the first X-ray image based on an input by an operator;
an obtaining unit configured to obtain the first region of interest in the first X-ray image, and a first anatomical form in the first region of interest in the first X-ray image;
a form search unit configured to search the second X-ray image for a second anatomical form similar to the first anatomical form in the first region of interest in the first X-ray image;
a region determination unit configured to determine a second region of interest in the second X-ray image so as to include the searched second anatomical form, in a case in which the second anatomical form is searched from the second X-ray image, so that a size of the second region of interest is substantially the same as the size of the first region of interest and a position of the first anatomical form in first region of interest is substantially the same as a position of the second anatomical form in the second region of interest; and
an enlarging unit configured to enlarge the first region of interest in the first X-ray image set by the setting unit and the second region of interest in the second X-ray image obtained by the region determination unit,
wherein the first region of interest and the second region of interest enlarged by the enlarging unit are respectively displayed on an image display unit.

2. The apparatus according to claim 1, wherein said at least one processor and memory further cooperate to function as an obtaining unit configured to a region of interest as the observation area, as the first region of interest, from a region of the first image captured by said portable X-ray detector.

3. The apparatus according to claim 1, wherein said at least one processor and memory further cooperate to function as a first display unit configured to enlarge and display the first region of interest on a display.

4. The apparatus according to claim 1, wherein said at least one processor and memory further cooperate to function as:
a clipping unit configured to clip the second region of interest from the second image; and
a second display unit configured to enlarge and display the second region of interest on a display.

5. The apparatus according to claim 1, wherein the first anatomical form and the second anatomical form are a continuous bone structure.

6. The apparatus according to claim 5, wherein the continuous bone structure is any of cervical vertebrae, thoracic vertebrae, or joints.

7. The apparatus according to claim 1, wherein said form search unit determines that the second anatomical form is a region similar to the first anatomical form, when a pattern match degree is higher than a predetermined value.

8. The apparatus according to claim 1, wherein said region determination unit extracts the second region of interest such that the second region of interest has the same size as that of the first region of interest and the second anatomical form is located at the same position as that of the first anatomical form.

9. The apparatus according to claim 4, wherein said at least one processor and memory further cooperate to cause the second region of interest to be affine-transformed to make the first anatomical form of the first region of interest have the same area as that of the second anatomical form of the second region of interest, and wherein said second display unit enlarges and displays the affine-transformed second region of interest.

10. The X-ray imaging apparatus according to claim 1,
wherein said region determination unit is configured to determine a region of a third image captured by said portable X-ray detector for a third anatomical form similar to a second anatomical form that is similar to the first anatomical form searched from a second image captured by said portable X-ray detector; and
the obtaining unit is configured to obtain a region of interest from the third image so as to include the third anatomical form.

11. The X-ray imaging apparatus of claim 1, wherein said region determination unit is configured to, based on the determined second anatomical form and a size of the first region of interest, determine the second region of interest so that a size of the second region of interest is substantially the same as the size of the first region of interest.

12. The X-ray imaging apparatus of claim 11, wherein said region determination unit is configured to determine the second region of interest so that a position of the determined second anatomical form in the second region of interest is substantially the same as a position of the obtained first anatomical form in the first region interest.

13. The X-ray imaging apparatus of claim 1, wherein said form search unit is configured to determine a difference of the enlargement ratios of the first and second images, in order to search the second anatomical form.

14. The X-ray imaging apparatus of claim 1, wherein said form search unit is configured to determine a difference of the tilts of said portable X-ray detector capturing the first and the second image, to search the second anatomical form.

15. The X-ray imaging apparatus of claim 1, wherein said form search unit is configured to perform pattern matching processing, based on the obtained first anatomical form, on the second image.

16. The X-ray imaging apparatus of claim 1, wherein said form search unit is configured to, in a case in which a third, a fourth and a fifth image are captured in this temporal order by said portable X-ray detector, and in which anatomical forms are specified on both the third and the fourth image, search the second anatomical form based on the specified anatomical form on the fourth image instead of using the specified anatomical form on the third image.

17. The apparatus according to claim 1, wherein a series of processes by the apparatus are performed in the same surgical operation.

18. The apparatus according to claim 1, wherein the first image and the second image are obtained during one study or one exam.

19. The apparatus according to claim 1, further comprising a setting unit configured to set the first region of interest of the first image based on an input by an operator.

20. The apparatus according to claim 1, further comprising a unit configured to perform an adjustment such that a shape and an area of the first region of interest is the same as the shape and the area of the second region of interest and the first and second anatomical forms are disposed at the same position in each region of interest.

21. The apparatus according to claim 1, further comprising a transforming unit configured to perform an affine-transformation of the second image in accordance with the first image with respect to enlargement ratios and tilts of the first and second images.

22. The apparatus according to claim 1, wherein a region of interest of a third image is determined based on the second region of interest of the second image.

23. The apparatus according to claim 1, wherein a shape and an area of the enlarged first region of interest is approximately equal to a shape and an area of the enlarged second region of interest.

24. An X-ray imaging method comprising:
   a receiving step of receiving a first X-ray image and a second X-ray image of an object, from a portable X-ray detector, the portable X-ray detector being such as not to allow accurate reproduction of a position of the portable X-ray detector;
   a setting step of setting a first region of interest of the first X-ray image based on an input by an operator;
   an obtaining step of obtaining the first region of interest in the first X-ray image, and a first anatomical form in the first region of interest in the first X-ray image;
   a form searching step of searching the second X-ray image for a second anatomical form similar to the first anatomical form in the first region of interest in the first X-ray image;
   a region determination step of, based on the second anatomical form found in said form searching step, determining a second region of interest in the second image, corresponding to the first region of interest from a region of the second image so as to include the second anatomical form, so that a size of the second region of interest is substantially the same as the size of the first region of interest and a position of the first anatomical form in first region of interest is substantially the same as a position of the second anatomical form in the second region of interest; and
   an enlarging step of enlarging the first region of interest in the first X-ray image set in the setting step and the second region of interest in the second X-ray image obtained in the region determination step,
   wherein the first region of interest and the second region of interest enlarged in the enlarging step are respectively displayed on an image display unit, and
   wherein at least one of said steps is performed by a computer.

25. A non-transitory computer-readable storage medium storing, in executable form, a program for causing a computer to execute an X-ray imaging method comprising:
   a receiving step of receiving a first X-ray image and a second X-ray image of an object, from a portable X-ray detector, the portable X-ray detector being such as not to allow accurate reproduction of a position of the portable X-ray detector;
   a setting step of setting a first region of interest of the first X-ray image based on an input by an operator;
   an obtaining step of obtaining the first region of interest in the first X-ray image, and a first anatomical form in the first region of interest in the first X-ray image;
   a form searching step of searching the second X-ray image for a second anatomical form similar to the first anatomical form in the first region of interest in the first X-ray image;
   a region determination step of, based on the second anatomical form found in said form searching step, determining a second region of interest in the second image corresponding to the first region of interest from a region of the second image so as to include the second anatomical form, so that a size of the second region of interest is substantially the same as the size of the first region of interest and a position of the first anatomical form in first region of interest is substantially the same as a position of the second anatomical form in the second region of interest; and
   an enlarging step of enlarging the first region of interest in the first X-ray image set in the setting step and the second region of interest in the second X-ray image obtained in the region determination step,
   wherein the first region of interest and the second region of interest enlarged in the enlarging step are respectively displayed on an image display unit.

* * * * *